United States Patent
Chen

(10) Patent No.: US 9,057,656 B2
(45) Date of Patent: *Jun. 16, 2015

(54) PRESSURE INDICATION DEVICE OF INFLATION MACHINE WITH SAFETY PRESSURE RELIEF

(71) Applicant: Chi-Wen Chen, New Taipei (TW)

(72) Inventor: Chi-Wen Chen, New Taipei (TW)

( * ) Notice: Subject to any disclaimer, the term of this patent is extended or adjusted under 35 U.S.C. 154(b) by 197 days.

This patent is subject to a terminal disclaimer.

(21) Appl. No.: 13/869,974

(22) Filed: Apr. 25, 2013

(65) Prior Publication Data

US 2014/0318260 A1    Oct. 30, 2014

(51) Int. Cl.
*G01L 17/00* (2006.01)
*G01L 19/10* (2006.01)
*G01L 7/16* (2006.01)
*G01L 19/06* (2006.01)

(52) U.S. Cl.
CPC ............. *G01L 7/166* (2013.01); *G01L 19/10* (2013.01); *G01L 17/00* (2013.01); *G01L 19/0618* (2013.01)

(58) Field of Classification Search
CPC ............................ G01L 17/00; G01L 19/0618
USPC ...................................... 73/732–744
See application file for complete search history.

(56) References Cited

U.S. PATENT DOCUMENTS

| | | | | |
|---|---|---|---|---|
| 318,152 A * | 5/1885 | Ellis | | 73/744 |
| 1,275,180 A * | 8/1918 | Willard | | 73/744 |
| 1,384,218 A * | 7/1921 | Stickel | | 417/63 |
| 1,425,614 A * | 8/1922 | Stickel | | 141/95 |
| 1,647,818 A * | 11/1927 | Semak | | 417/419 |
| 1,777,009 A * | 9/1930 | Matson | | 141/383 |
| 2,038,928 A * | 4/1936 | Farley et al. | | 73/744 |
| 3,438,351 A * | 4/1969 | Kirkwood | | 116/208 |
| 3,981,625 A * | 9/1976 | Wickenberg | | 417/63 |
| 4,198,921 A * | 4/1980 | Horton | | 116/283 |
| 4,449,412 A * | 5/1984 | Fallon et al. | | 73/738 |
| 4,460,018 A * | 7/1984 | Sweeney | | 137/807 |
| 4,779,457 A * | 10/1988 | Huang | | 73/146.8 |
| 4,884,175 A * | 11/1989 | Weng | | 362/119 |
| 5,104,295 A * | 4/1992 | Wong | | 417/44.6 |
| 6,095,762 A * | 8/2000 | Wheeler | | 417/275 |
| 6,216,541 B1 * | 4/2001 | Carpenter | | 73/741 |
| 6,485,276 B2 * | 11/2002 | Yang | | 417/423.14 |
| 8,733,270 B2 * | 5/2014 | Chen | | 116/272 |
| 2005/0265873 A1 * | 12/2005 | Chou | | 417/552 |
| 2013/0133565 A1 * | 5/2013 | Chen | | 116/266 |

* cited by examiner

*Primary Examiner* — Lisa Caputo
*Assistant Examiner* — Jonathan Dunlap
(74) *Attorney, Agent, or Firm* — Leong C. Lei

(57) ABSTRACT

A pressure indication device is provided to connect to an inflation mechanism of an inflation machine. The pressure indication device includes a hollow tubular body in which a push bock is received in a manner of being movable by a pressure conducted into the hollow tubular body and connected to a linearly movable plate and biased by an elastic element. The hollow tubular body has a tubular wall forming a pressure relief hole at a preset position corresponding to a maximum allowable pressure level. A scale bar having graduations is provided along a moving path of the plate. The elastic force of compression of the elastic element serves as a reaction force (restoration and returning force) for the linear movement of the plate. A pressure conducted into the hollow tubular body from the inflation machine drives the plate to move and thus indicates the pressure level.

6 Claims, 5 Drawing Sheets

PRESSURE INDICATION DEVICE OF INFLATION MACHINE WITH SAFETY PRESSURE RELIEF

TECHNICAL FIELD OF THE INVENTION

The present invention generally relates to a pressure indication device of inflation machine, and more particularly to an inflation machine that comprises an inflation mechanism having an air compartment that is provided with at least two outlet openings respectively coupled to first and second conveyance tubes, of which the first conveyance tube is connected to the pressure indication device and the second conveyance tube supplies air to an object to be inflated, and the pressure indication device comprises an elastic element of which an elastic force of compression is used to serve as a reaction force (restoration returning force) for linear movement of a plate and correspondingly, a pressure induced in the air compartment drives the plate to make a linear movement of which the distance of movement is indicative of the level of pressure, wherein when the inflation pressure exceeds the maximum pressure setting, the excess of the inflation pressure is released through a pressure relief hole formed in a hollow tubular body of the pressure indication device to ensure safe inflation for protecting the inflation machine and inflated object.

DESCRIPTION OF THE PRIOR ART

Various machines or devices that are available in the market are often provided with a mechanical pressure gauge, which functions to measure and display a pressure level. Further, in measuring gas pressure to inspect the internal pressure level of a conveyance conduit or a storage device, a mechanical pressure gauge is also used.

Most of the conventional mechanical pressure gauges are manufactured according the principle of Bourdon tube. A Bourdon tube based mechanical pressure gauge applies the principle that the Bourdon tube undergoes expansion and deformation when pressurized and causes rotation of an indication hand so as to achieve indication of pressure level through two types of pressurized expansion and pressure relief. Further, the structure of the conventional Bourdon tube type mechanical pressure gauge is composed of components including an air inlet seat, a plurality of gear trains, a pull bar, a return spring, an indicator axle. An end of the Bourdon tube is connected to the pull bar and an opposite end is connected to the air inlet seat. When air flows through the air inlet seat into the Bourdon tube, the Bourdon tube is pressurized and undergoes expansion to start deformation and also to move the pull bar so that the pull bar acts on the gear trains to drive the indicator axle for rotating an indicator hand. On the other hand, when the pressure diminishes, the Bourdon tube restores its original shape and the indicator axle is acted upon by the returning spring to have the indicator hand return to a reset position, so that the capability of pressure measurement of the pressure gauge is realized.

However, in the conventional Bourdon tube type mechanical pressure gauge, since the components such as the Bourdon tube, the gear trains, and the returning spring are precise and fragile components. The more the precise components are, the higher the cost will be. Further, the Bourdon tube and the returning spring are easily affected by external temperature (cold or hot) and humidity and the original expansion coefficient or spring characteristics may be changed indirectly, so that the measurement of pressure may get out of accuracy. Further, transmission among the gear trains must be achieved through precise mating engagement. The higher the machining precision of the mating gear teeth is, the greater the cost will be. Thus, when the pressure gauge is dropped or hit inadvertently, errors or gaps may be present between the mated gear teeth, leading to undesired instability of deviation or positional shifting or jerking of the indicator hand when pressure varies. These are common problems of the conventional Bourdon tube type mechanical pressure gauges.

Further, in respect of the manufacturing of the conventional pressure gauges, due to the high precision of components and assembling, it is easy to increase the number of disqualified products and the assembling operation may get slow and complicated and require durability and impact test. All these affect, directly or indirectly, the manufacturing cost and the quantity of acceptable products. This is also a problem to be overcome for the conventional pressure gauges.

In the technical field of the present invention, for air charging machinery, such as the inflation machine, besides the installation and use of a pressure gauge that is an essential component, another necessary arrangement is a safety pressure relief component for air inflation. Putting it in a simple way, for an inflation machine to be in compliance with safety regulations, the arrangement of pressure relief is a must for the purposes of protecting the major components of the inflation machine from damage caused by being continuously kept in a condition of over-loading and excessively high pressure and also for ensuring safe inflation of an inflated object. Such an arrangement of safety is designed based on the risk that in case of uninterrupted and continuous charging of air to an inflated object by the inflation machine to such a pressure level exceeding the critical pressure level that the inflated object can stand, explosion may occur and causes damage and injury. Thus, the conventional pressure relief valves that are provided for inflation machines must be carefully selected high precision pressure relief valves that require a large amount of costs in order to achieve a safety measure for both safe inflation and pressure relief.

SUMMARY OF THE INVENTION

In view of the above problems, the primary object of the present invention is to provide a pressure indication device of inflation machine with safety pressure relief, in which the pressure indication device is additionally provided with a safety function of pressure relief so as to provide a more durable way of pressure indication and safer way of pressure relief to thereby achieve the effects of durability, low cost, and a combination of the two functions.

According to the present invention, the pressure indication device comprises a linearly movable plate and an elastic element. A scale bar having graduations is provided along a moving path of the plate. The elastic force of compression of the elastic element serves as a reaction force (restoration and returning force) for the linear movement of the plate. Correspondingly, a pressure is induced in an air compartment of the inflation mechanism the so that the moving distance of the plate is indicative of the pressure level and thus precise measurement of pressure can be realized. Consequently, there is no need to adopt the conventional pressure gauge that is expensive and not durable and is easily affected by various factors.

As such, when an inflation pressure exceeds a critical level or a maximum set pressure level, the excess of the inflation pressure is released through a pressure relief hole formed in the hollow tubular body of the pressure indication in order to ensure safety inflation of the inflation machine and the object to be inflated.

Another objective of the present invention is to provide a pressure indication device of inflation machine. The pressure indication device is connected to an inflation mechanism of an inflation machine. The inflation mechanism comprises an air compartment formed on a piston cylinder. The air compartment is provided with at least two outlet openings that are respectively coupled to a first conveyance tube and a second conveyance tube, wherein the first conveyance tube is connected to the pressure indication device and the second conveyance tube is provided for supplying air to an object to be inflated. The first conveyance tube transmits air pressure to the pressure indication device so that the distance of linear movement of the plate driven by the air pressure is indicative of the pressure level and thus precise measurement of the internal pressure of the air compartment of the inflation mechanism the can be realized.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
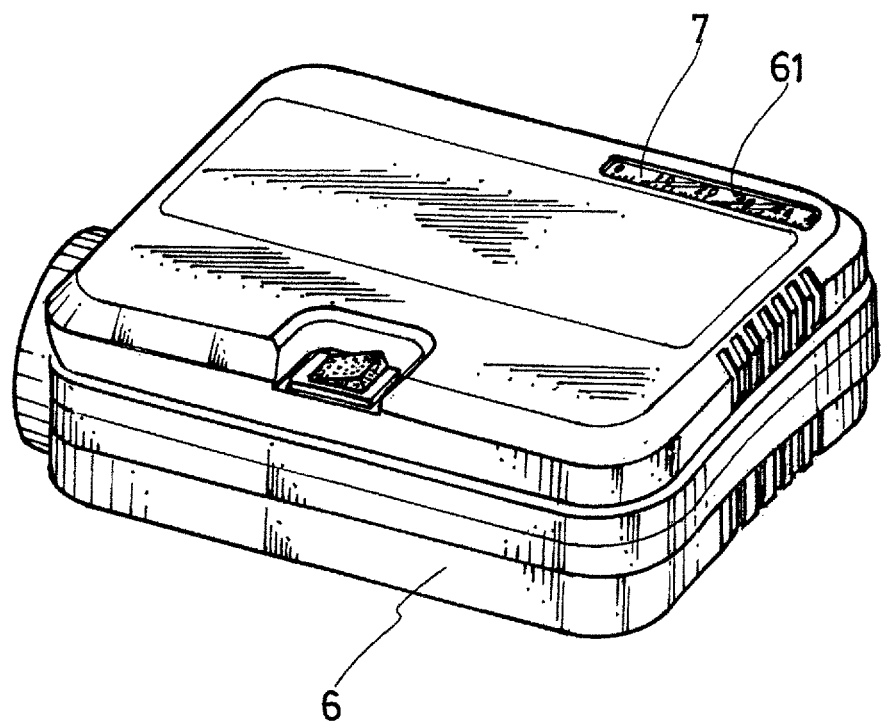
FIG. 1 is a perspective view showing an inflation machine according to an embodiment of the present invention.
Figures 2, 3:
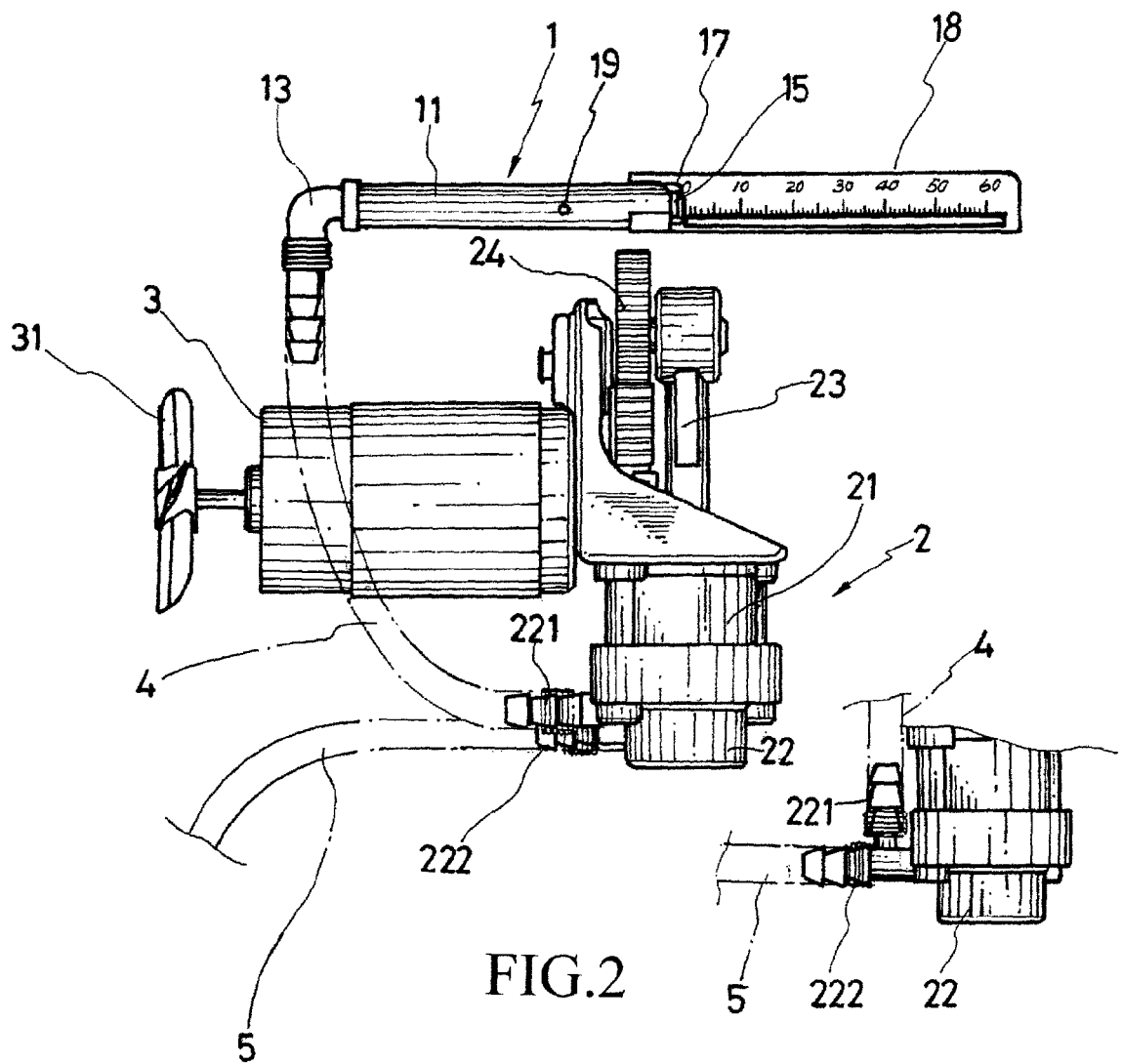
FIG. 2 is a schematic view showing a pressure indication device according to an embodiment of the present invention.
FIG. 3 is a schematic view showing an inflation mechanism of the inflation machine according to another embodiment of the present invention.
Figure 4:
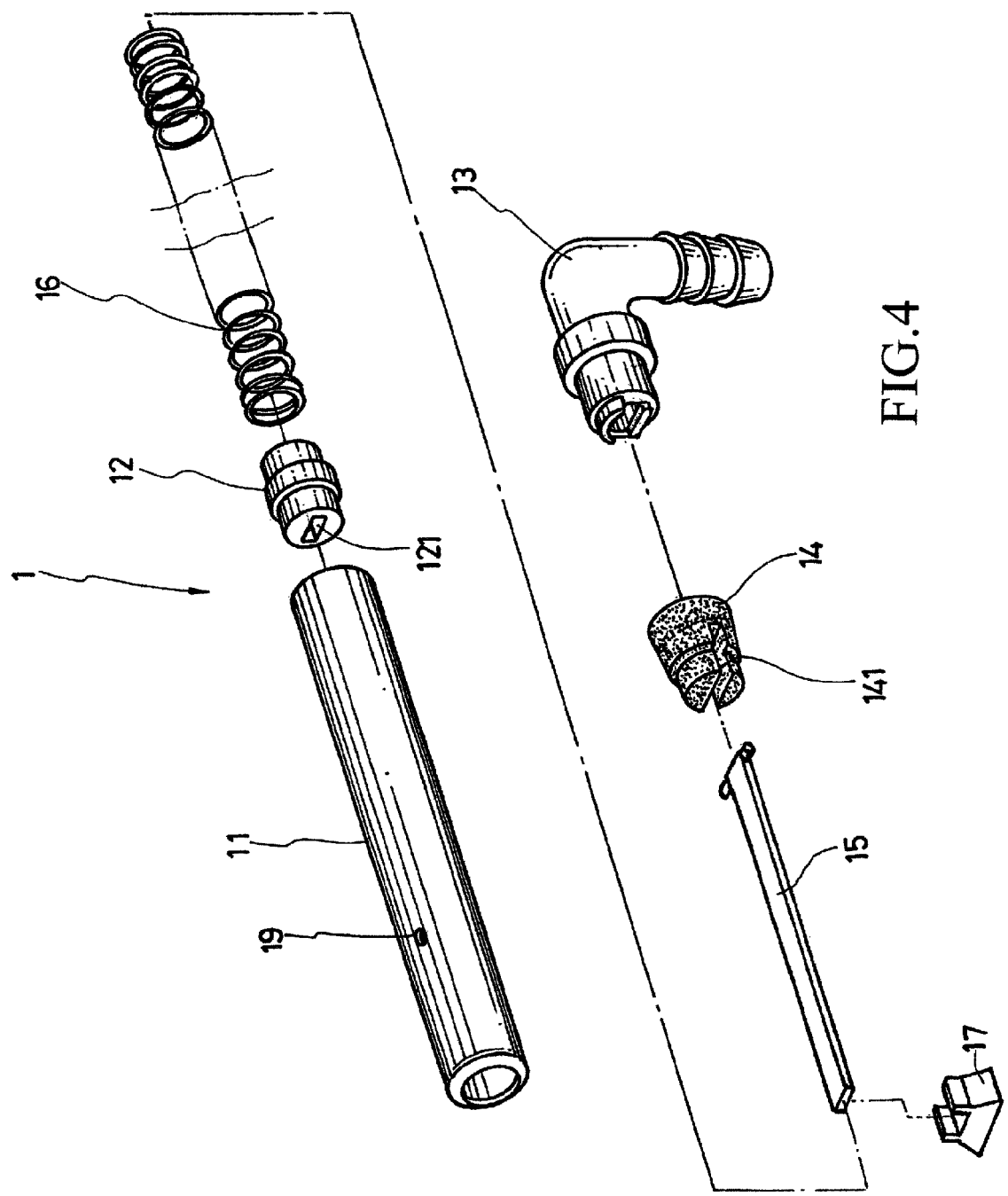
FIG. 4 is an exploded view of the pressure indication device of the present invention.
Figure 5:
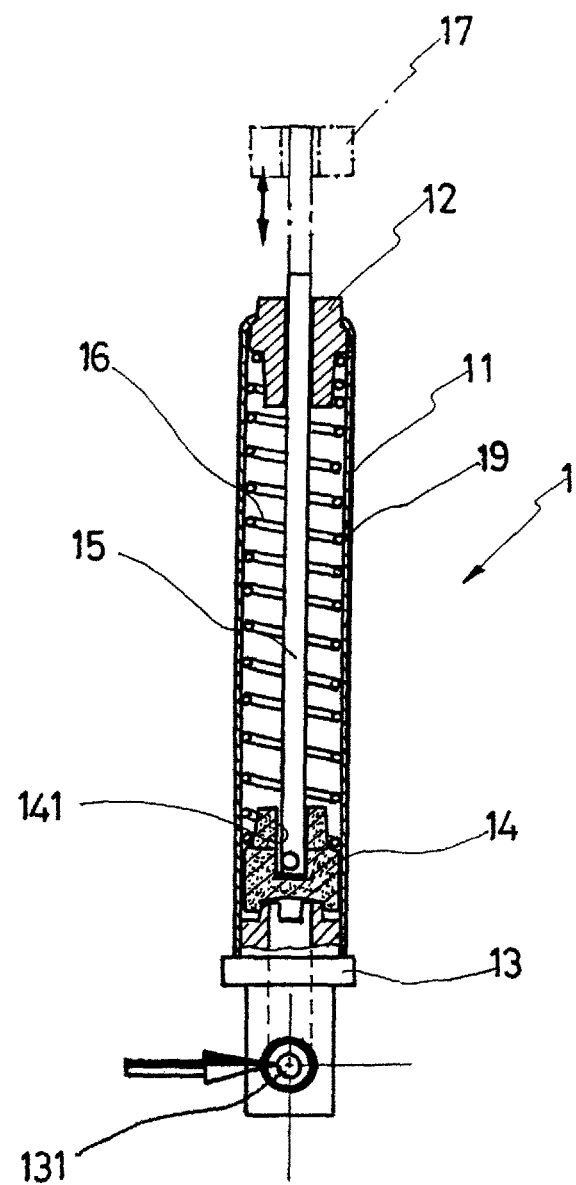
FIG. 5 is a cross-sectional view, in an assembled form, illustrating an operation of the pressure indication device of the present invention.
Figure 6:
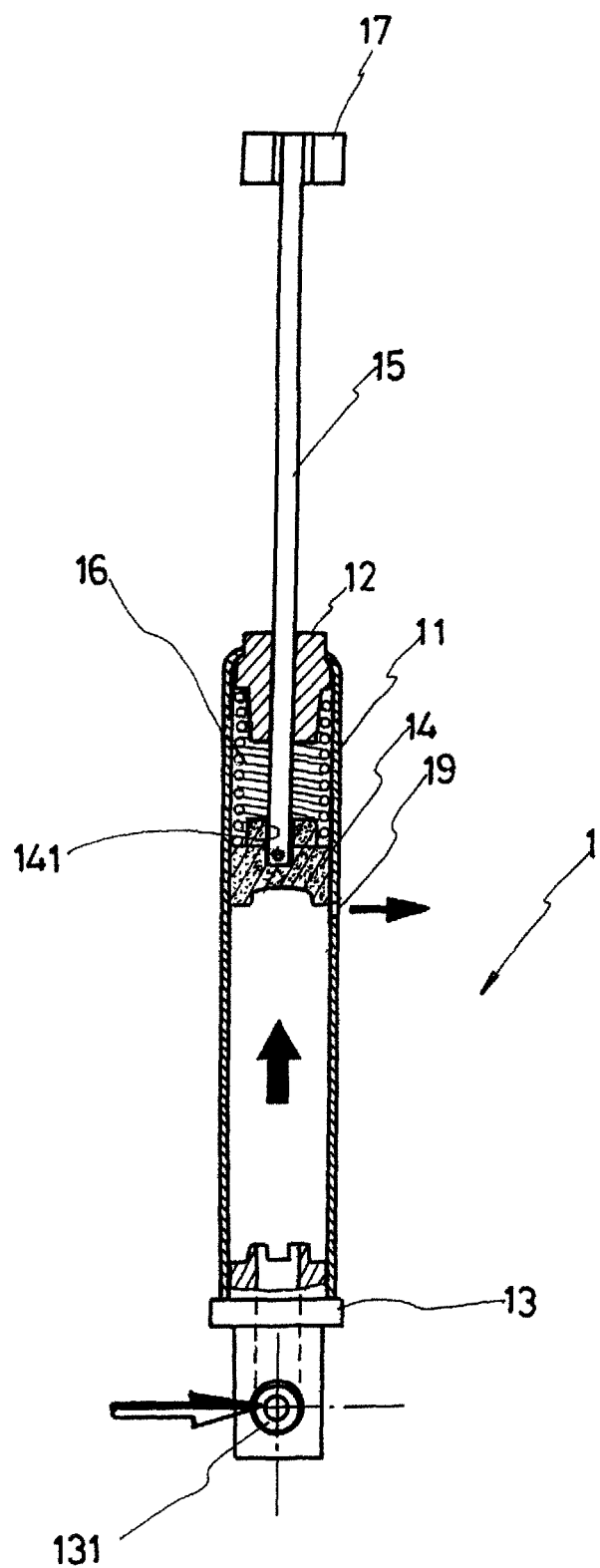
FIG. 6 is also a cross-sectional view, in an assembled form, illustrating an operation of the pressure indication device of the present invention.

Referring to FIGS. 1, 2, 3, 4, and 5, the present invention discloses a pressure indication device of inflation machine. The pressure indication device 1 is mounted to an inflation machine 6. The pressure indication device 1 comprises a hollow tubular body 11. The hollow tubular body 11 has two ends that are respectively provided with a protection cover 12 and an inlet joint 13. The protection cover 12 forms a through hole 121. The inlet joint 13 forms an inlet opening 131 extending outside the hollow tubular body 11. The hollow tubular body 11 receives therein a push block 14 between the protection cover 12 and the inlet joint 13. The push block 14 has an outer circumference that provides an excellent function of air tightness. The push block 14 is connected to a strip-like plate 15, and the plate 15 has an end extending beyond and exposed outside the through hole 121 of the protection cover 12. Further, the hollow tubular body 11 receives therein an elastic element 16 between the protection cover 12 and the push block 14. The elastic element 16 can be for example a spring encompassing outside the plate 15. Further, the hollow tubular body 11 has a tubular wall in which a pressure relief hole 19 is formed. The pressure relief hole 19 is set at a location corresponding to a set level of pressure or the maximum bearable pressure level of an object to be inflated. This can be generally done through calculation on the basis of displacement of the plate 15 driven by the spring force of the elastic element 16 in order to determine the most suitable location of the pressure relief hole 19, as shown in FIG. 6. Further, the portion of the plate 15 that is exposed outside the through hole 121 of the protection cover 12 is provided with an indicating piece 17. Arranged outside the hollow tubular body 11 is a scale bar 18 corresponding to a moving path of the plate 15 and the scale bar 18 forms graduations, as shown in FIG. 2.

With such an arrangement, air pressure is applicable, through the inlet opening 131 of the inlet joint 13, into the interior space of the hollow tubular body 11. The pressure causes a displacement of the push block 14 and the plate 15 and at the same time compresses the elastic element 16, eventually realizing linear movement of the push block 14, the plate 15, and the elastic element 16 within the hollow tubular body 11. On the other hand, when air pressure diminishes, the push block 14 is acted upon by a restoration force of the elastic element 16 so that the push block 14 and the plate 15 return to home position and are thus reset. As such, the pressure indication device 1 uses the elasticity of the elastic element 16 caused by compression thereof to serve as a force for driving linear movement of the push block 14 and the plate 15, so that when air pressure drives the push block 14 and the plate 15 to do linear movement, observation of the moving distance of the plate 15 with respect to the scale bar 18 may indicate the air pressure level and precise measurement of the air pressure can be achieved. In case that the air pressure exceeds a preset critical pressure level or the maximum allowable pressure level (which generally corresponds to the push block 14 is moved to exceed the location of the pressure relief hole 19), the excessive of the air pressure will be released through the pressure relief hole 19 of the hollow tubular body 11 thereby ensuring safety of inflation of the inflation machine and the inflated object, as shown in FIG. 6.

When the plate 15 is moved along the scale bar 18, the indicating piece 17 provides an indication to allow a user to get clearly aware of the relative position of the plate 15 with respect to the graduations of the scale bar 18.

The push block 14 and the plate 15 can be arranged as a combined component, or alternatively, the push block 14 and the plate 15 are arranged as two independent components connected to each other. An example will be given for the present invention, in which the push block 14 forms a fixing slot 141 so that the plate 15 may be fixed in the fixing slot 141 of the push block 14 to allow the plate 15 to move in synchronization with the push block 14.

The pressure indication device 1 of the present invention can be mounted to an inflation machine 6. The inflation machine 6 comprises: an inflation mechanism 2 and a driving device 3. The pressure indication device 1 is connected to the inflation mechanism 2 of the inflation machine 6. The inflation mechanism 2 comprises a cylinder 21. An air compartment 22 is formed at an end of the cylinder 21 and the air compartment 22 is provide with at least two outlet openings 221, 222, which are respectively connected to a first conveyance tube 4 and a second conveyance tube 5. A piston rod 23 is arranged at an opposite end of the cylinder 21 and the piston rod 23 is connected to a gear train 24. An end of the driving device 3 is coupled to the gear train 24 of the inflation device 2 and an opposite end carries fan blades 31.

The driving device 3 drives the gear train 24 to rotate and the gear train 24 causes the piston rod 23 to move so as to have an airflow generated by the inflation device 2 to flow through the outlet openings 221, 222 of the air compartment 22 to get into the first conveyance tube 4 and the second conveyance tube 5. The first conveyance tube 4 is connected to the inlet joint 13 of the pressure indication device 1. The second conveyance tube 5 may be extended to supply air to an object to be inflated (such as a tire, a ball, and an inflating tool, which is not shown in the drawings), whereby the air pressure generated by the inflation mechanism 2 or a back pressure caused by an external pressure source (thus, being applicable to pressure detection or to relief of the pressure to a preset level when the external pressure exceeds the preset level) can flow through the air compartment 22 and the first conveyance tube 4 to the pressure indication device 1. Through the relative displacement of the plate 15 of the pressure indication device 1 with respect to the scale bar 18, the gas pressure level can be precisely measured.

Next, the outlet openings 221, 222 of the air compartment 22 of the inflation mechanism 2 can be independent channels (as sown in FIG. 2) or the outlet openings 221, 222 are of a bifurcate arrangement having a common channel (as shown in FIG. 3), both being equivalent structure.

Further, the inflation machine 6 comprises an observation window 61 formed in a casing thereof and the observation window 61 corresponds to the scale bar 18 of the pressure indication device 1, so that a user may observe the pressure level through the observation window 61. Further, the observation window 61 may be provided with a cover 7. Further, the present invention may selectively provide lighting elements (not shown) around the scale bar 18 of the pressure indication device 1 to form backlighting for the scale bar 18, whereby a user may use it in nighttime or in a dark environment.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An inflation machine comprising a casing, an inflation mechanism, which is received in the casing and is coupled to and driven by a driving device, and a pressure indication device, which is mounted inside the casing, wherein the inflation mechanism comprises an air compartment, the air compartment being provided with at least two outlet openings, which are respectively connected to a first conveyance tube and a second conveyance tube, the first conveyance tube being connected to the pressure indication device, the second conveyance tube being adapted to connect to an object to be inflated, a scale bar being provided outside the pressure indication device, wherein the pressure indication device comprises a hollow tubular body that comprises a tubular wall in which a pressure relief hole is formed and adapted to be in direct communication with the external atmosphere, the hollow tubular body having two ends that are respectively provided with a protection cover and an inlet joint, the protection cover forming a through hole, the inlet joint forming an inlet opening extending outside the hollow tubular body and communicating with the first conveyance tube, the hollow tubular body receiving therein a push block between the protection cover and the inlet joint, the push block being connected to a strip-like plate, the plate having an end extending beyond and exposed outside the through hole of the protection cover, the hollow tubular body receiving therein an elastic element between the protection cover and the push block, the push block and the strip-like plate being movable in the hollow tubular body and along a moving path; and wherein the scale bar is arranged at a fixed position with respect to the hollow tubular body of the pressure indication device to correspond to the moving path of the plate, whereby the push block and the strip-like plate is movable with respect to the scale bar and when the push block is moved in the hollow tubular body, along the moving path, to a predetermined location corresponding to the pressure relief hole, pressure inside the hollow tubular body, which is connected through the first conveyance tube to the air compartment of the inflation mechanism, is allowed to directly release through the pressure relief hole to the external atmosphere.

2. The inflation machine according to claim 1, wherein the elastic element comprises a spring encompassing outside the plate.

3. The inflation machine according to claim 2, wherein the end of the plate exposed outside the through hole of the protection cover is provided with an indicating piece.

4. The inflation machine according to claim 1, wherein the scale bar forms graduations, a lighting element being provided around the scale bar.

5. The inflation machine according to claim 1, wherein the two outlet openings of the air compartment are independent channels.

6. The inflation machine according to claim 1, wherein the two outlet openings of the air compartment are of a bifurcate arrangement having a common channel.

* * * * *